United States Patent [19]
Riester et al.

[11] 3,894,433
[45] July 15, 1975

[54] ROTAMETER SYSTEM WITH ELECTRICAL READ-OUT

[75] Inventors: Hubert A. Riester, Huntingdon Valley; John S. Yard, Warminster, both of Pa.

[73] Assignee: Fischer & Porter Co., Warminster, Pa.

[22] Filed: Feb. 13, 1974

[21] Appl. No.: 441,997

[52] U.S. Cl.................................. 73/209; 73/313
[51] Int. Cl............................................... G01f 1/00
[58] Field of Search............ 73/208, 209, 210, 308, 73/403, 290 V, 313; 340/189 R, 189 M, 191

[56] References Cited
UNITED STATES PATENTS

| | | | |
|---|---|---|---|
| 2,514,907 | 7/1950 | Stewart | 73/209 |
| 3,182,500 | 5/1965 | Ishii | 73/209 |
| 3,208,281 | 9/1965 | Kalmus et al. | 73/313 |
| 3,372,592 | 3/1968 | Gravert | 73/313 |

Primary Examiner—Richard C. Queisser
Assistant Examiner—John P. Beauchamp

[57] ABSTRACT

A rotameter system adapted to produce an electrical signal which is linearly proportional to flow rate. The system is formed by a primary including a float contained in a variable area tube through which flows the fluid whose rate is to be measured, the float being slideable along a vertical guide rod and being raised or lowered in the tube to a degree depending on flow rate, and a secondary constituted by a linear-displacement transducer acting to measure the time required for a displacement pulse to travel from the float along the guide rod to a fixed receiving point and to convert this interval into an electrical signal representative of the float position.

13 Claims, 8 Drawing Figures

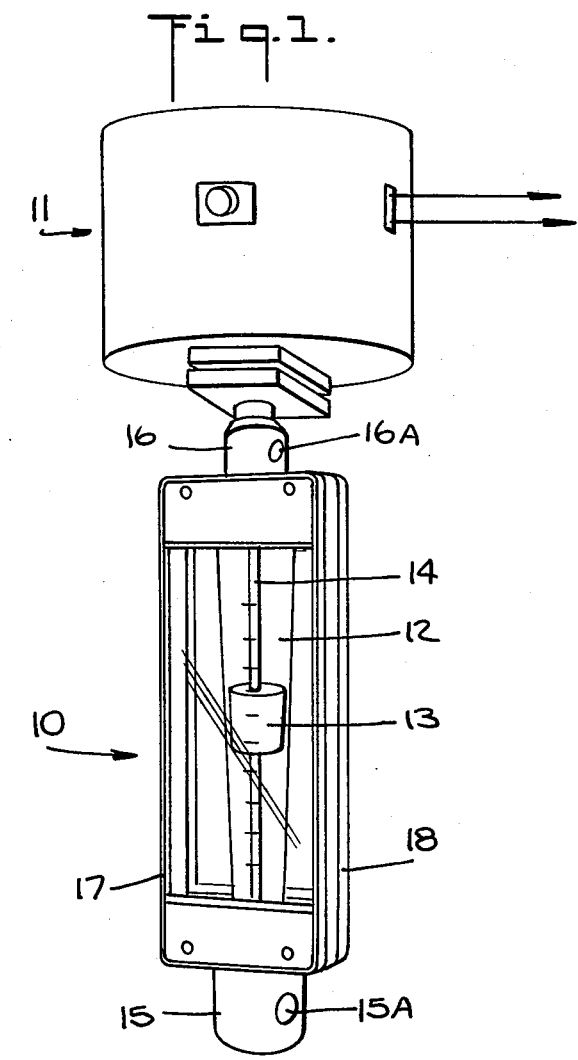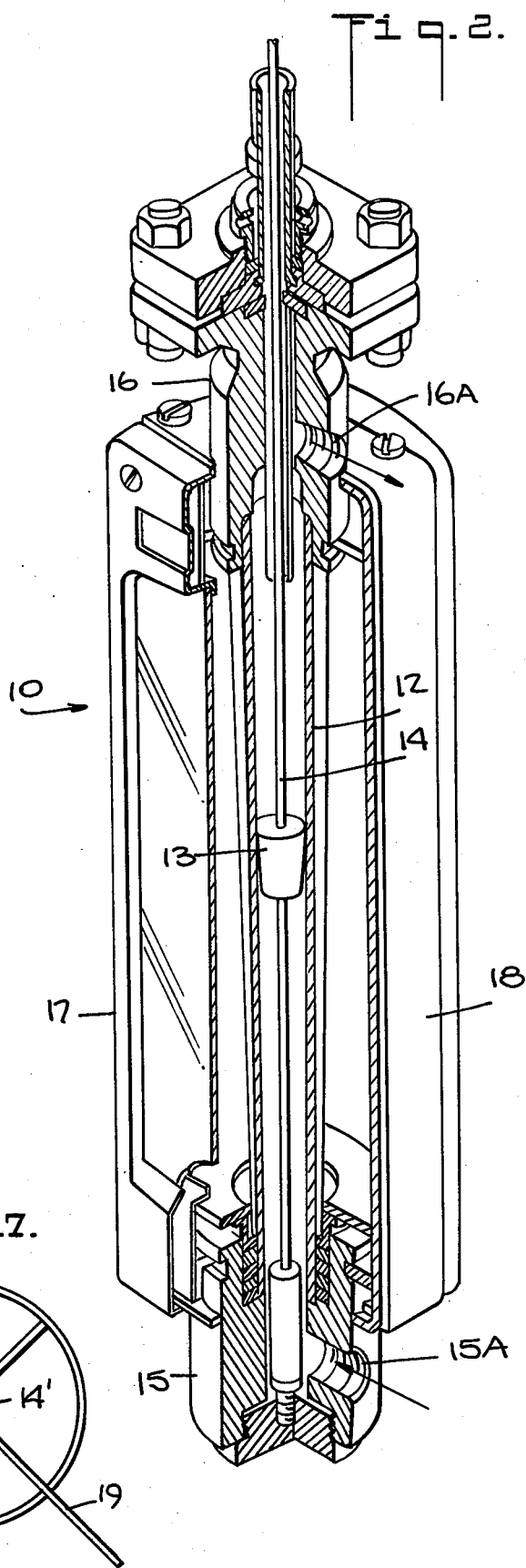

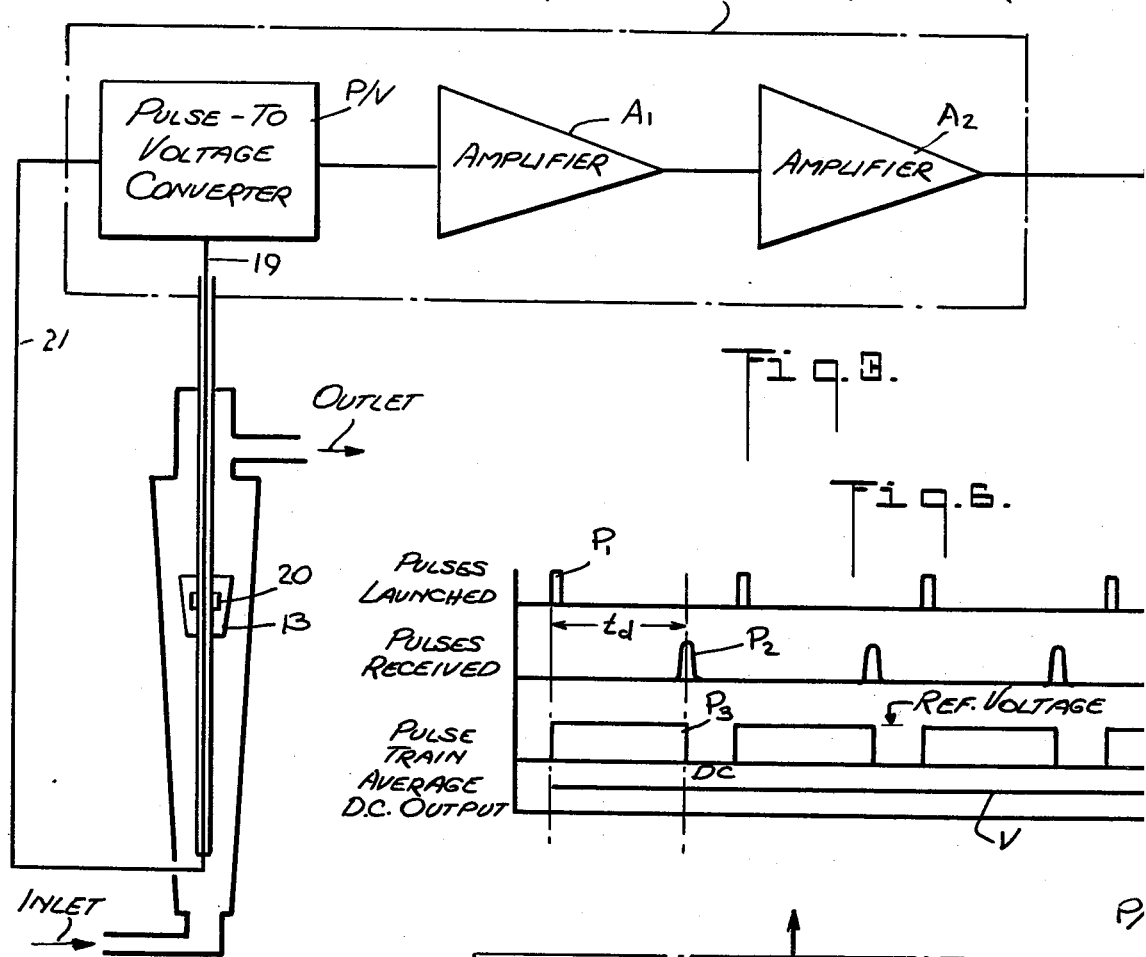
Fig. 3.
Fig. 6.
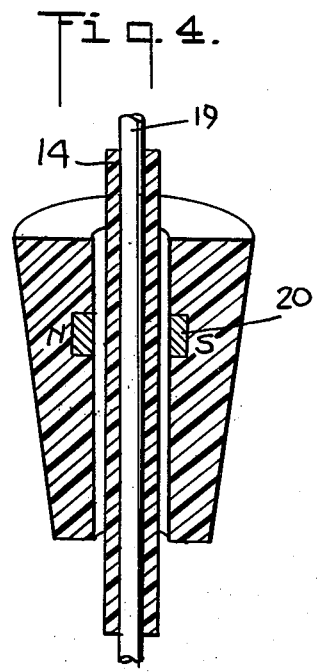
Fig. 4.
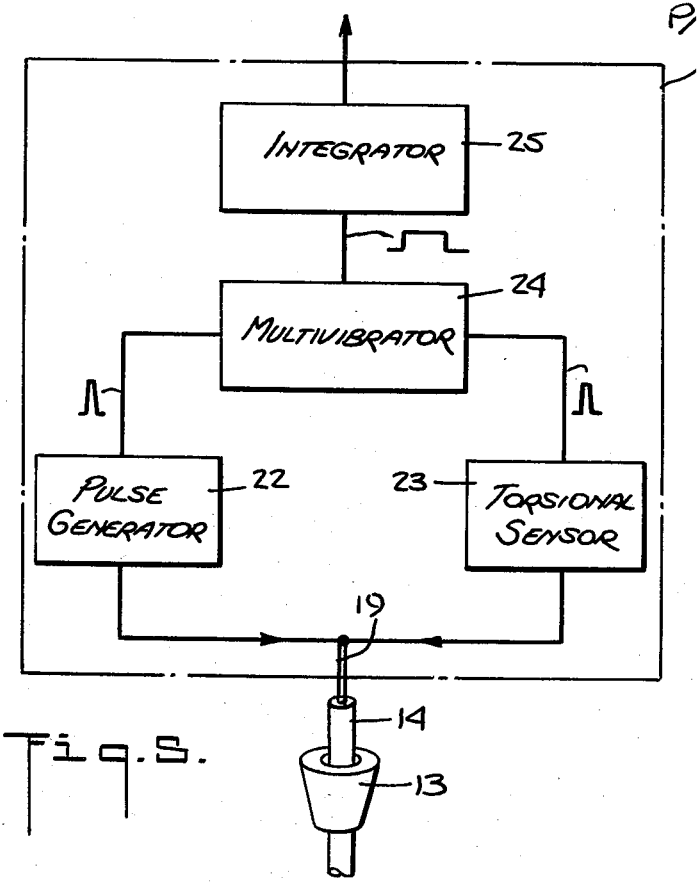
Fig. 5.

ROTAMETER SYSTEM WITH ELECTRICAL READ-OUT

BACKGROUND OF THE INVENTION

This invention relates generally to the measurement of fluid flow rate, and more particularly to a rotameter system adapted to produce an electrical signal which is linearly proportional to flow rate.

In a variable area meter or rotameter for measuring flow rate, only the orifice area is varied as a function of flow, a constant pressure difference being maintained. The typical rotameter is constituted by an upright, tapered tube containing a weighted plummet or float which is raised to a position of equilibrium between the downward force of the float and the upward force of the fluid flowing past the float through the surrounding annular orifice. In a rotameter, the flow restriction is the area of the annular orifice, this area being enlarged as the float rises in the tapered tube. The pressure differential is fixed, this being determined by the weight of the float and the buoyant forces.

The term "rotameter" is derived from the fact that the float was originally designed with slots serving to impart a rotational force thereto for the purpose of centering and stabilizing the float. The present trend however is toward guided, non-rotating floats. For visual read-out, the vertical position of the float in the variable area bore or tube is indicated along a calibrated scale etched or otherwise formed along the tube surface.

Among prior patents disclosing known types of rotameters are U.S. Pat. Nos. 3,416,370 and 3,715,921 held by the assignee of the instant invention.

In many flowmeter applications, secondary functions are required for recording or process control purposes, or to provide a read-out when the process fluid is opaque so that the float cannot be seen and visual indication is precluded. In these situations it is necessary to translate the vertical position of the float into a corresponding electrical value which may be indicated, recorded or transmitted. The term "rotameter system", as used herein, designates the combination of a rotameter primary element in which a float shifts position as a function of flow rate, and a transducer secondary element coupled to the primary to convert the float position into a corresponding electrical signal.

The transducer in known types of rotameter systems may take the form of a stem affixed to the float and connected to a permeability element forming part of an inductance bridge whereby the signal produced by the bridge depends on the float position. This signal may be amplified electronically to drive a pen-positioning recording motor, or it may be transmitted to a remote point to carry out process control functions. For pneumatic transmission, the stem is connected to a permanent magnet affording magnetic coupling to a pneumatic motion transmitter external to the rotameter tube, the transmitter generating an air pressure proportional to the level of the float.

The use of various reluctance and linear differential transformers to convert float position into a proportional electrical signal is somewhat restricted by reason of the generally long travel path of the float. Conversion of float position to mechanical, linear or angular motion involves levers, gears and linkages, with their attendant problems of friction, wear and slippage. Moreover with existing secondary elements, the relationship between float position and output signal is not always precisely linear and the output reading is therefore inaccurate.

SUMMARY OF THE INVENTION

In view of the foregoing, it is the main object of this invention to provide a highly accurate rotameter system whose secondary yields an electrical output signal that is linearly proportional to float position.

More specifically, it is an object of this invention to provide a system of the above-type which incorporates a linear-displacement transducer to determine the position of the float in the variable-area tube, the transducer generating an analog or digital electrical output representative of the float position.

Also an object of the invention is to provide a system of the above-type in which the float is operatively coupled to the transducer by means of a permanent magnet head, the arrangement being effectively frictionless so that there is nothing to wear out or deteriorate.

Among the significant advantages of a rotameter system in accordance with the invention which incorporates a linear-displacement transducer to convert float position into an analog signal, is excellent linearity, repeatability and stability. Because the transducer may be made with solid state circuits, the system which combines a primary and secondary element into a unitary device, may be highly compact.

Briefly stated, these objects are accomplished in a rotameter system whose primary includes a float contained in an upright variable area tube through which flows the fluid whose rate is to be measured. The float is slideable along a guide rod and is raised or lowered in the tube to a degree depending on flow rate. The system secondary is constituted by a linear-displacement transducer acting to measure the time required for a displacement pulse generated at the float to travel along a magnetostrictive wire within the guide rod to a fixed reference or receiving point and to convert this interval into an electrical signal representative of the float position.

In a preferred embodiment of the invention, a sonic current pulse is generated and coupled to a magnetostrictive wire within the guide rod, the current pulse creating a magnetic field that intercepts a magnetic field produced by a permanent magnet head encased in the flow-sensitive float. The resultant interaction generates in the wire a reverse torsional strain which travels back towards the fixed point where it is detected. The time interval between the initial sonic current pulse and the torsional strain is measured and converted into a corresponding analog or digital value.

OUTLINE OF THE DRAWING

For a better understanding of the invention as well as other objects and further features thereof, reference is made to the following detailed description to be read in conjunction with the accompanying drawing, wherein:

FIG. 1 is a perspective view of a rotameter system in accordance with the invention, FIG. 2 is a cut-away view of the rotameter primary included in the system;

FIG. 3 is a schematic diagram of the system;

FIG. 4 is a sectional view of the float contained in the rotameter;

FIG. 5 is a block diagram of the pulse-to-voltage converter included in the secondary;

FIG. 6 illustrates the time relationship between the sonic pulses launched by the float and the received pulses as well as the voltages derived from the time interval between the launched and the received pulses;

FIG. 7 shows one modification of the system; and

FIG. 8 shows another modification of the system.

DESCRIPTION OF THE INVENTION

Referring now to FIGS. 1 and 2, there is shown a rotameter system in accordance with the invention, the main elements of which are a rotameter primary generally designated by numeral 10 and a linear-displacement transducer 11 serving as the secondary element. The system operates on the variable area principle to measure and indicate the instantaneous flow rate of a fluid passing through the rotameter.

Rotameter 10 consists essentially of a tapered glass meter tube 12, a float 13 which is slideable along a vertical guide rod 14, and end fittings 15 and 16. End fitting 15 is provided with an inlet port 15A and end fitting 16 is provided with an outlet port 16A. Side plates 17 and 18 serve to protect the meter tube. It is to be understood that the invention is by no means limited to the particular rotameter structure and any other known form may be used.

The meter may be installed and supported directly by the process piping, although it is usually desireable to provide suitable braces or brackets to support the inlet and output pipes. The meter may also be panel mounted. Regardless of the mounting method, the meter should be installed, substantially vertically, with the outlet (highest scale graduation) at the top. It will be seen that a scale is etched along the tube to afford a direct visual read-out. The function of the secondary is to provide a corresponding electrical read-out for recording, process control or any other purpose calling for a secondary function.

The secondary which is a linear-displacement transducer, operates in conjunction with a wire 19 suspended within a conductive guide rod 14 along which float 13 is slideable. Rod 14 is therefore in tubular form and protects the wire 19 from fluid passing through the flow tube. Rod 14 may be coated with a layer of Teflon or other non-conductive, non-reactive material having a low coefficient of friction so that the float rides freely on the rod and is guided thereby. Wire 19 is formed of electrically-conductive material having magnetostrictive properties, such as a wire made of a nickel-cadmium alloy which is heat treated to effect stabilization thereof.

Magnetostriction refers to the change in the dimensions of ferromagnetic substances in response to a magnetic force. This effect appears most strongly in iron, nickel, cobalt and in alloys of these metals. There are many possible physical changes that a magnetostrictive material may undergo, for the changes may be in linear dimensions, in circular dimensions or in volume. Circular changes in a magnetostrictive wire take the form of a twisting or torsional effect, referred to in the literature as the Wiedmann effect.

As shown in FIG. 4, float 13 which rides on rod 14, incorporates a permanent magnet 20 (or a plurality of magnets) which is protectively encapsulated therein and is arranged to establish a constant magnetic field whose lines of flux intercept magnetostrictive wire 19 at the float position. In order to launch sonic pulses at this position, current pulses are applied to wire 19 by means including a lead 21 connected to the guide rod 14.

As shown in FIG. 3, the linear displacement transducer is comprised of a torsional pulse-to-voltage converter P/V whose output is applied to an amplifier $A_1$, the output current of this amplifier being in a range which is acceptable in process control engineering, namely 4 to 20 Ma. In this way the flow rate scale of the rotameter which runs from a minimum to a maximum float value is translated into corresponding current values. The output of amplifier $A_1$ is applied to an operational amplifier $A_2$ which is adapted to characterize the current range, as required.

In the pulse-to-voltage converter P/V, a high-precision quartz-crystal electronic clock or other stable, continuously-running pulse generator applies current pulses to wire 19 at a repetition rate determined by the frequency of the generator. Each current pulse in the wire creates a momentary field which interacts with the constant magnetic field produced by the magnet 20 in the float 13. This momentary interaction serves to produce in wire 19 a torsional strain wave which is propagated along the wire in both directions, that is toward the fixed reference end and away therefrom.

Thus each time a current pulse is generated, a sonic pulse is generated from the float and proceeds to travel along the wire toward the reference end. The time it takes for the sonic torsional strain pulse to arrive at the reference end is precisely related to the controlled properties of the wire and depends on the distance between the float and the reference end.

At the reference end, a torsional sensor 23, such as strain gauge 23, is provided to detect the sonic wave in order to generate a "receive" pulse. The time interval between the application of the current pulse to the wire, and the detection of the received torsional strain pulse is proportional to the positive of the float relative to the reference point. It is now necessary to convert the time interval into an analog voltage whose amplitude represents the time interval.

This is accomplished by means including a multivibrator 24 which produces a rectangular pulse whose duration is equal to the interval between the launched pulse and the received pulse. Multivibrator 24 is coupled to pulse generator 22 so that each time a current pulse is produced, at which instant a sonic pulse is launched from the float, the rectangular pulse is initiated. Multivibrator 24 is also coupled to torsional transducer 23 so that each time a receive pulse is detected, the rectangular wave is terminated.

The resultant train of rectangular wave pulses is filtered in integrator 25 to produce an average D-C voltage whose level depends solely on the duration of the rectangular pulses, assuming that these pulses are at a constant amplitude.

The operation of the converter P/V is illustrated graphically in FIG. 6 in which the pulses $P_1$ represent the launched pulses and pulses $P_2$ the received sonic pulses. The time interval $t_d$ therebetween is proportional to the distance between the float and the reference end and therefore reflects flow rate. Each rectangular pulse $P_3$ in the train thereof produced by the multivibrator or one-shot circuit has a leading edge which is coincident with a launched sonic pulse and a trailing edge coincident with the receipt of the launched pulse. When the train of rectangular pulses $P_3$ is filtered, then we have an average D-C output as shown by line V.

It is essential that the amplitude or height of the rectangular pulses $P_3$ be kept at a constant level. In practice this may be accomplished by reference zener diodes or other known techniques for maintaining a constant pulse height. The amplitude of the rectangular pulse train may also be controlled by an externally-applied reference voltage, in which case the D-C output becomes a function of the external reference so that closer control of system accuracy may be achieved. The level of the average D-C output represented by line V depends on the float position.

In the rotameter system shown in FIGS. 1 and 2, the inlet and outlet ports are lateral with respect to the flow passage extending through the variable area tube. In some flowmeter designs, the inlets and outputs are coaxial with the flow passage; hence it is not possible to extend the guide rod axially through the upper end fixture in the manner shown in FIGS. 1 and 2.

In the situation where the flow tube 26 as shown in FIG. 7, has an axial inlet and outlet, the guide rod 14 for the float is supported coaxially within the tube by a spider 27 one of whose spokes serves as a connection for the reverse torsional stress sensor means. Alternatively, as shown in FIG. 8, the guide rod 14 which incorporates wire 19 may be curved at its upper end, the rod passing laterally out of the flow tube. A connection to the wire is made at the reference end to apply current pulses thereto and to receive sonic pulses from float 13 slideable along the straight portion of the rod.

While there has been shown and described a preferred embodiment of the invention it will be appreciated that many changes and modifications may be made therein without, however, departing from the essential spirit of the invention.

I claim:

1. A rotameter system adapted to produce an electrical signal which is proportional to flow rate, said system comprising:
    A. a primary element including a variable area flow tube through which flows the fluid whose rate is to be measured, and a float slideable along a vertical guide rod disposed within said tube, said float being raised and lowered to a degree depending on flow rate, and
    B. a linear displacement transducer operatively coupled to the upper end of said rod and including means to generate a torsional strain pulse at the position of the float, means at a fixed point coupled to said rod to receive said pulse, means to measure the time interval required for said torsional strain pulse generated at the float position to travel from the float along the rod to said fixed receiving point, and means to convert this interval into an electrical signal representative of the float position.

2. A system as set forth in claim 1, wherein said torsional strain pulse generating means is constituted by a permanent magnet embedded in said float, a magnetostrictive wire embedded in said rod, and a pulse generator which applies periodic current pulses to said wire, each creating a momentary field which interacts with a magnetic field produced by said permanent magnet embedded in said float, thereby imparting said torsional strain to said wire.

3. A system as set forth in claim 2, wherein said current pulses are produced by a quartz-crystal oscillator operating at a predetermined frequency.

4. A system as set forth in claim 2, wherein said means to receive the torsional strain pulses at the fixed receiving point is constituted by a torsional sensor to produce a receive pulse at a time displaced from the current pulse.

5. A system as set forth in claim 4, wherein the means to convert the time interval into an electrical signal includes a rectangular wave generator producing rectangular pulses whose duration is equal to the period between a current pulse and a received pulse, and means to integrate the rectangular pulses to produce an average D-C voltage whose level is proportional to the float position.

6. A system as set forth in claim 5, including means to maintain the amplitude of the rectangular pulses at a constant level.

7. A system as set forth in claim 5, further including an amplifier connected to the output of the integrating means to produce a current signal in a range proportional to the range in which the float is shifted from a minimum to a maximum position.

8. A system as set forth in claim 1, wherein said flow tube has a lateral inlet port and a lateral outlet port and said guide rod extends outside of said tube through the upper end thereof and is coupled to said transducer.

9. A system as set forth in claim 1, wherein said flow tube has an inlet at the lower end thereof and an outlet at the upper end thereof, said guide rod being supported coaxially within said tube by a spider one of whose spokes is coupled to said transducer.

10. A system as set forth in claim 1, wherein said flow tube has an inlet at the lower end thereof and an oulet of the upper end thereof, the upper end of said guide rod being bent and passing laterally outside of said tube to be coupled to said transducer.

11. A rotameter system adapted to produce an electrical signal which is linearly proportional to flow rate, said system comprising:
    A. a primary including a variable area flow tube through which flows the fluid whose rate is to be measured, a float incorporating a permanent magnet slideable along a guide rod disposed within said tube, said guide rod having a magnetostrictive wire enclosed therein, said float being raised and lowered on said rod to a degree depending on flow rate whereby the magnetic field produced by said magnet intercepts said wire at a point depending on the float position.
    B. a linear displacement transducer operatively coupled to the upper end of the wire in said rod and including a pulse-to-voltage converter to apply current pulses into said wire producing a momentary field that interacts with said magnetic field to produce a torsional strain in said wire, thereby causing a strain pulse to be launched at the float position whose arrival is detected at the upper end of the wire to produce a receive pulse, the interval between the current pulse and the received pulse being measured to provide said electrical signal proportional to flow rate.

12. A system as set forth in claim 11, wherein said rod is formed by a Teflon-coated conductive tube incorporating said wire.

13. A system as set forth in claim 11, wherein said wire is formed of a nickel-cadmium alloy.

* * * * *